United States Patent [19]

Sayles

[11] Patent Number: 5,022,306
[45] Date of Patent: Jun. 11, 1991

[54] METHOD OF EJECTING AN INTERCEPTOR MISSILE FROM ITS SILO

[75] Inventor: David C. Sayles, Huntsville, Ala.

[73] Assignee: The United States of America as represented by the Secretary of the Army, Washington, D.C.

[21] Appl. No.: 779,404

[22] Filed: Mar. 10, 1977

[51] Int. Cl.$^5$ ............... F41F 3/04; F02K 9/00; F42B 15/10
[52] U.S. Cl. ............... 89/1.8; 60/256; 102/374; 102/380; 264/3.1
[58] Field of Search ............ 60/246; 425/DIG. 12; 86/1 R; 264/3 R, 3 C; 89/1.8, 1.813, 1 A; 102/49.7, 103, 70

[56] References Cited

U.S. PATENT DOCUMENTS

| | | | |
|---|---|---|---|
| 3,041,914 | 7/1962 | Gurton et al. | 264/3.1 |
| 3,107,620 | 10/1963 | O'Donnell | 102/289 |
| 3,137,126 | 6/1964 | Madison | 60/256 X |
| 3,267,672 | 8/1966 | Craig et al. | 60/256 X |
| 3,324,795 | 6/1967 | Miles et al. | 102/289 |
| 3,570,364 | 3/1971 | Thibodaux | 86/1 R |
| 3,696,749 | 10/1972 | Scanlon | 102/49.7 |

FOREIGN PATENT DOCUMENTS 1257603  11/1946  France .................... 60/256

Primary Examiner—David H. Brown
Attorney, Agent, or Firm—Werten F. W. Bellamy; Anthony T. Lane

[57] ABSTRACT

Disclosed is a method for ejecting an interceptor missile from the silo in which it is stored. The method employs an ultrahigh-burning rate (e.g., burning rate 10-20 inches per second) booster solid propellant grain in combination with a fuse or a combination of fuses having a burning rate (e.g. 25 to 100 inches per second) or a rate which is well above that of the ultrahigh-burning rate booster solid propellant grain. The fuses are designed to a predetermined exterior contour which is the same as the exterior contour of the mandrel which would normally be used to provide the contour to the internal perforation of the booster propellant grain. The method include positioning the fuses longitudinally in the booster motor instead of the normally used mandrel, and then casting the propellant around the fuse or a combination of fuses and curing the propellant to yield a booster solid propellant grain. When the fuses are ignited by means of aft end ignition, their burning rapidly creates a port in the center of the booster solid propellant grain. When the burning of the fuses is near complete, and the propellant becomes exposed, the booster propellant commences burning, and then provides the propulsive power to boost the ballistic interceptor from its storage silo.

2 Claims, 1 Drawing Sheet

METHOD OF EJECTING AN INTERCEPTOR MISSILE FROM ITS SILO

CROSS-REFERENCE TO RELATED APPLICATION

This application relates to my copending application Ser. No. 05/779,402, filed Mar. 10, 1977, titled: "Method of Changing Propellant Grain Configuration."

BACKGROUND OF THE INVENTION

Interceptor missiles are generally stored in an underground launch station or silo which provides concealment, protection from the elements, and protection from enemy attack. The underground launch station also provides protection to inhabited areas nearby in the event of an accidental in-launch station explosion. The missiles are part of a complex, remotely controlled and operated system which includes a means for ejecting the missile from the launch station. After the ejection of the missile, the booster motor is ignited for providing thrust for the missile.

The contemporary method to eject an interceptor from its underground launch station employs a large gas generator and a hydraulically-actuated piston as the means to boost the interceptor from its station. As one could surmise from the described means for ejection, the contemporary method leads to complexities which increase the chances for failures in ejecting the interceptor and directing it to the point of interception.

A preferred system for ejecting a missile from its storage silo would obviate the need for hydraulic equipment and accessory items.

Therefore, an object of this invention is to provide a method for ejecting a missile from its storage silo by a propulsive force derived from the missile itself thereby obviating the need for hydraulic equipment and accessory items.

Another object of this invention is to provide a booster solid propellant grain having 100% loading with a portion of the loading being an embedded ultrahigh-burning rate fuse or combination of fuses around which the booster propellant is cast and cured. The fuse or combination of fuses is designed to have an exterior contour which is the same as the exterior contour of the mandrel which would normally be used for forming the internal configuration or central perforation of the booster solid propellant grain.

SUMMARY OF THE INVENTION

The method of this invention relates to ejecting an interceptor missile from the silo in which it is stored in a pre-launch mode. The method comprises:

1. Embedding a fuse or combination of fuses containing pyrotechnic materials of ultrahigh-burning rates of the order of 25 to 100 inches per second into the central perforation of the booster solid propellant grain. The embedding is accomplished by first designing the fuse or combination of fuses to an exterior contour which is the same as the exterior contour of the mandrel which would normally be used to provide the contour to the internal perforation of the booster solid propellant grain and then casting the booster propellant formulation around the longitudinally positioned fuse or a combination of fuses, curing the propellant, and positioning the grain in the interceptor missile that is subsequently positioned in a storage silo in a pre-launch mode.
2. Positioning an ignition means for the fuses to provide for aft end ignition (e.g. ignition means of the electrically initiated type or other type ignition means which can be initiated remotely are suitable).
3. Igniting the fuses by aft-end ignition to rapidly create a port or internal perforation in the center of the booster solid propellant grain. When the burning of the fuses is near complete as the propellant becomes exposed at the aft end, the propellant commences burning, and then provides the propulsive force to eject the interceptor missile from its silo.

BRIEF DESCRIPTION OF THE DRAWING

The figures of the drawing depict configurations of an interceptor missile at various stages during the using of the method of this invention.

DESCRIPTION OF THE PREFERRED EMBODIMENT

Figure 1:
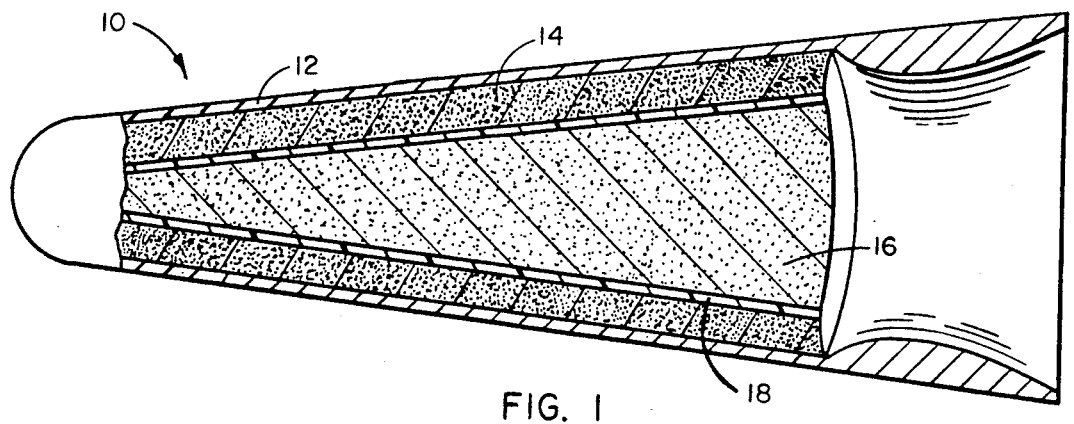
FIG. 1 is a diagrammatic view showing a prefire motor configuration (before fuse is ignited).

The method of this invention employs a fuse or a combination of fuses having a burning rate well above that of the ultrahigh-burning rate propellants which are being used in interceptor missiles. This means burning rates of the order of 25 to 100 inches per second are required for the fuse to perform satisfactorily in accordance with the method of this invention.

An acceptable baseline fuse design for this application is a metaloxidant composition having a cylindrical cross-section encased in a sheathing material comprised of a composite, graphite filament-reinforced epoxy resin. The pyrotechnic composition's burning rate needs to be well in excess of the ablation rate of the sheathing material of the fuse, and the sheathing material needs to be fully consumed during the burning process so that the exhaust gases ar debris-free.

A suitable initiator for the fuse or a combination of fuses consists of a Holex squib and an igniter charge of 1O g. of a stoichiometric boron-potassium nitrate mixture which is inserted in a cavity at the aft end of the fuse. It is bonded in with an adhesive, such as EPON 946 and activator.

The characteristics and properties of the fuse required for use in this invention have been described. The combination of the fuses and the positioning of the fuses with respect to the propellant grain actually determine the success of this invention. Therefore, it is necessary for the fuse or combination of fuses to define the contour to the internal perforation of the booster propellant since the fuse or combination of fuses is used in place of the mandrel. A preferred design for the fuse or a combination of fuses provide a cone-shaped exterior contour. Hence, the fuses are first constructed of the described material to a predetermined exterior contour as required by techniques employed in the art. The constructed fuses are then positioned longitudinally in the booster motor instead of (replacement of) the mandrel, and the booster propellant formulation is cast around the fuses. After curing of the propellant to the fuses and within the motor case, an integral booster solid propellant grain results.

The booster motor is provided with the necessary accessory items required for an interceptor missile; these accessor items would vary in accordance with the sophistication required for the parameter of operation of the interceptor missile system.

The interceptor missile is positioned in a storage silo from which it will be ejected and subsequently directed to its point of interception. The final step of the method of this invention proceeds by igniting the fuses by means of aft-end ignition which is followed by rapid burning of the fuse or combination of fuses to create a port in the center of the booster's main propellant grain. When the burning of the fuses is nearly complete, and the main propellant becomes exposed, the booster propellant commences burning, and then provides the propulsive force to boost the interceptor missile out of its silo. It is necessary to recognize that the burning rate of the fuses proceeds at a fast rate with a generation of considerably less exhaust gases than would be derived from the rocket propellant. The exhaust gases would be of considerably higher molecular weight and as a result, the propulsive power would be considerably less than the exhaust gases derived from the burning main propellant. Therefore, the rapid, ejective power for the interceptor missile is derived from the propellant booster grain in itself as more clearly explained in conjunction with the figures of the drawing.

FIG. 1 depicts booster motor 10 in a prefire motor configuration (before fuse is ignited). The propellant grain 14 with the fuse 16 encased in sheathing material 18, embedded therein as an integral unit, is encased in a motor case 12. Not shown are ignition means and accessory items.

Figure 2:
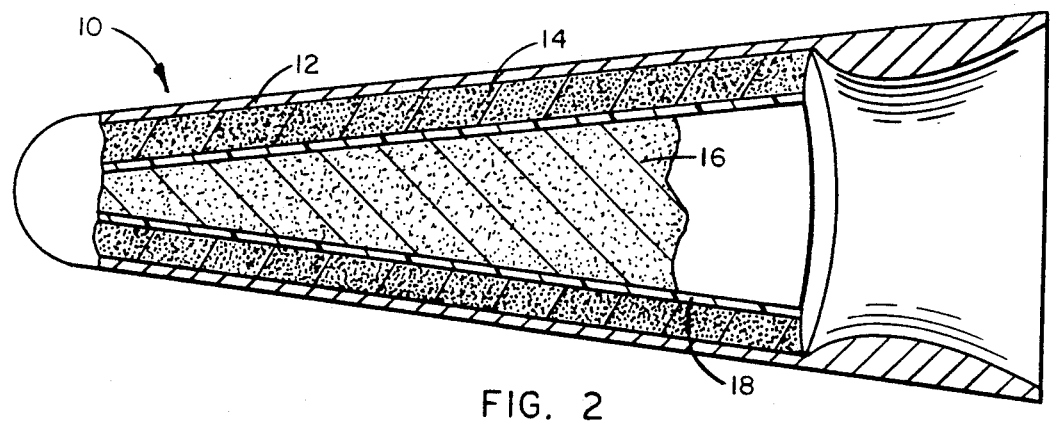
FIG. 2 is a diagrammatic view showing propellant grain configuration (when fuse is partially consumed).

FIG. 2 depicts the booster motor and identities specified in FIG. 1 description in propellant grain configuration when the fuse is partially consumed.

Figure 3:
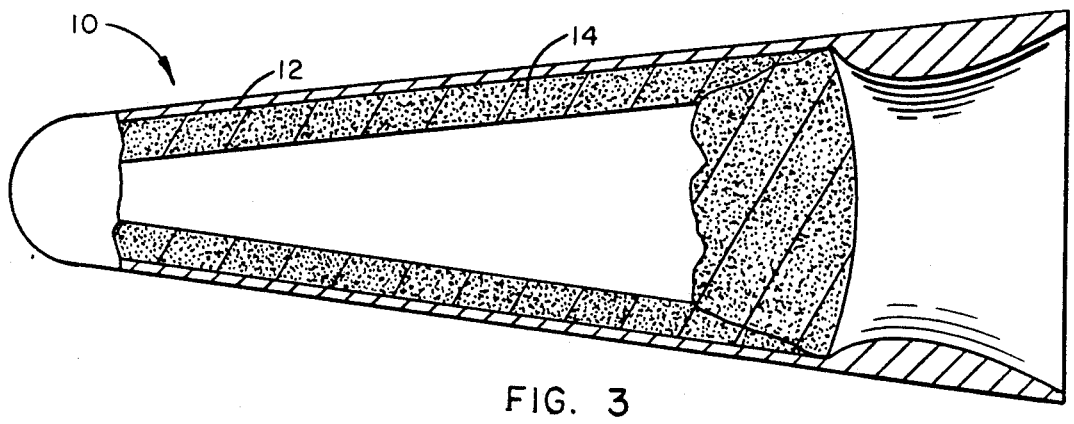
FIG. 3 is a diagrammatic view of the propellant grain configuration during stabilized burning (after fuse is fully consumed).

FIG. 3 depicts the booster motor and identities as specified in FIG. 2 description in a propellant grain configuration during stabilized burning after the fuse is fully consumed.

The advantages that would accrue from this invention disclosure can be enumerated as follows:

(a) It provides a mechanism for increasing the volumetric loading of interceptor booster motors from 70% to 100%. The small percentage (about 8%) of the fuse loading performs the functions of rapidly creating the internal perforation for the booster propellant grain while generating considerably less exhaust gases having considerably higher molecular weight that wouldn't be sufficient for ejection of interceptor missile; however, it provides conservation of booster propellant grain by only allowing ignition at time of fuse burn-out when propellant grain surface is first exposed at aft end. This reaction time is extremely short (from ignition of fuses to booster propellant grain ignition) because of high burning rate of fuses.

(b) It provides additional time before it is necessary to commit the interceptor to destroy an incoming target, or provides more time for the replacement in the event that the interceptor which is launched first fails to function satisfactorily.

(c) It provides a mechanism for reducing the action time, and this is equivalent to a large increase in burn-out velocity.

(d) And, especially for low-commit systems, and for relatively short action times, the launch delay time would be shortened, which is most significant since launch delay time takes up a considerable portion and large percentage of the action time.

The adoption of the method of fabricating a solid-propelled interceptor motor used in the method of this invention offers several advantages as additionally described below.

(1) Because of the high acceleration forces which would act on the propellant grain in an unpressurized second-stage motor during booster operation, the use of complicated, internal grain configurations, such as, star points, etc., would be impractical because these would undergo bending or shear off. By adopting the concept described in this invention, the propellants configuration would be reinforced by this fast-deflagrating mandrel, and as a consequence, configuration of any intricacy could be used.

(2) The fast-deflagrating mandrel material would increase the thrust derived from the motor, and serve to increase the motor loading efficiency and mass fraction.

(3) This would also eliminate the need for a structural support tube which would be inserted into the grain perforation to reinforce the propellant grain so that it would be able to withstand the acceleration loads that it would be subjected to during booster operation.

(4) The combustion of the mandrel would result in the generation of a large exhaust efflux, and a rapid buildup of pressure to its operating pressure. This would translate to a shortened action time which is essential for low-commit interceptors to intercept at lower altitudes.

(5) This would make practical the use of the conventional two-stage propulsion subsystem as well as a single-stage propulsion subsystem for advanced interceptors. The single propulsive stage design has been determined to be very sensitive insofar as mass fraction is concerned, because of this limitation, the single-stage design was assessed as being incapable of imparting the required velocity to an advanced interceptor.

(6) The propellant grain for the second-stage will have a conical perforation in the aft end which blends into a rather large stress-relief groove in the forward end. To fabricate such a configuration, a mandrel of complex design will be required whereas this will not be necessary using the approach described in this disclosure.

The fuse or a combination of fuses employed in this invention can be constructed of a ultrahigh-burning rate composition selected from the group consisting of an ultrahigh-burning rate difluoroamino-based propellant as defined under Example I as follows:

EXAMPLE I

| INGREDIENT | WEIGHT % |
| --- | --- |
| Ethyl Acrylate-Acrylic Acid | 27.5 |
| TVOPA* | 3.6 |
| ERL-4221** | 1.4 |
| Carboranylmethyl Propionate | 4.0 |
| HMS Graphite Linter (100 μm) | 2.0 |
| Aluminum Powder | 11.0 |
| Aluminum Flake | 1.0 |

-continued

| INGREDIENT | WEIGHT % |
|---|---|
| Ammonium Perchlorate | 50.0 |
| Lecithin | 0.1 |

*Tris 1,2,3 [bis(1,2-difluoroamino)ethoxy]propane
**4,5-Epoxycyclohexylmethyl 4',5'epoxycyclohexylcarboxylate, a high burning rate thermite material as defined under Example II as follows:

EXAMPLE II

| a metal selected from zirconium, boron or aluminum | 40 parts |
|---|---|
| lead (IV) peroxide | 60 parts, | a high burning rate thermite material as defined under Example III as follows:

EXAMPLE III

| a metal selected from zirconium, boron or aluminum | 33⅓ parts |
|---|---|
| plumbus-plumbic oxide (Pb₃O₄) | 66⅔ parts, | a preformed shaped material selected from beads, pellets, or agglomerates of a formulation as defined under Example IV as follows:

EXAMPLE IV

| INGREDIENT | WEIGHT % |
|---|---|
| Ammonium Perchlorate | 48.55 |
| Metal Fuel | 48.55 |
| Carboxyl-Terminated Polybutadiene Prepolymer (HC434) | 2.34 |
| DER-332* | 0.16 |
| ERLA-0510** | 0.38 |
| Chromium Octoate (5.5% Cr) | 0.02 |

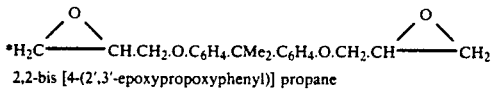

*H₂C——CH.CH₂.O.C₆H₄.CMe₂.C₆H₄.O.CH₂.CH——CH₂

2,2-bis [4-(2',3'-epoxypropoxyphenyl)] propane

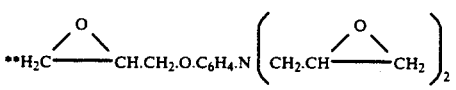

**H₂C——CH.CH₂.O.C₆H₄.N(CH₂.CH——CH₂)₂

O,N,N-tris(2,3-epoxypropyl)-4-aminophenol (Note: The preformed, shaped material is combined and bound together with an added binder material comprised of about 3–6 weight percent hydroxyl-terminated polybutadiene prepolymer that is crosslinked with about 0.5–1.0 weight percent of a diisocyanate crosslinking agent and containing from about 0.5 to about 2.0 weight percent of an added carboranyl burning rate catalyst), and a high burning rate composition as defined under Example V as follows:

EXAMPLE V

| Cesium or ammonium salt of dodecahydrodecaborane | 0.5 to 2 parts |
|---|---|
| resinous binder and inert materials | 98.0–99.5 |

I claim:
1. A method of ejecting an interceptor missile from the silo in which it is stored in a pre-launch mode, said method comprising:
 (i) providing said interceptor missile with a solid propellant booster motor comprised of an ultrahigh-burning rate booster solid propellant grain encased in a booster motor case, said ultrahigh-burning rate booster solid propellant grain containing an embedded fuse or a combination of fuses of a metal-oxidant composition that has a burning rate range well above that of said ultrahigh-burning rat booster solid propellant grain said embedded fuse or a combination of fuses having a cylindrical cross-section, and encased in a sheathing material comprised of a composite, graphite filament-reinforced epoxy resin; said embedded fuse or a combination of fuses designed to a predetermined exterior contour which is the same as the exterior contour of the mandrel which would normally be used to provide the contour to the internal perforation of the booster solid propellant grain; said ultrahigh-burning rate booster solid propellant grain formed by casting around said fuse or a combination of fuses which are longitudinally positioned in said booster motor case, an uncured booster propellant formulation and curing the propellant formulation to yield said ultrahigh-burning rate booster solid propellant grain;
 (ii) positioning an ignition means for said embedded fuse or a combination of fuses to provide for aft-end ignition;
 (iii) igniting said embedded fuse or a combination of said fuses by aft-end ignition to rapidly create by a burning process proceeding from the aft end to forward end of said embedded fuse or a combination of fuses, an internal perforation in the center of said ultrahigh-burning rate booster solid propellant grain, said burning of said embedded fuse or a combination of fuses proceeding at burning rate which is well in excess of the ablation rate of said sheathing material of said fuse or a combination of fuses to enable said sheathing material to be fully consumed during the burning process to thereby expose a surface of said ultrahigh-burning rate booster solid propellant grain at the time said burning process of said fuse or a combination of fuses nears completion; and
 (iv) allowing said exposed surface of said ultrahigh-burning rate booster solid propellant grain to commence burning to thereby provide the propulsive force to boost said ballistic interceptor missile from its storage silo.
2. The method of claim 1 wherein said burning rate range of said embedded fuse or a combination of fuses is about 25 to 100 inches per second and wherein said fuse or a combination of fuses are designed to a predetermined exterior contour of a cone.

* * * * *